United States Patent
Perucca et al.

(10) Patent No.: US 6,851,581 B2
(45) Date of Patent: Feb. 8, 2005

(54) WASHING AGENT DISPENSER FOR A HOUSEHOLD A DISHWASHER

(75) Inventors: Giovanni Perucca, Motta de' Conti (IT); Fabio Nebbia, Giarole (IT); Daniele Cerruti, Fontanetto Po (IT); Stefano Belfiore, Borgo San Martino (IT); Costanzo Gadini, Casale Monferrato (IT)

(73) Assignee: Eltek S.p.A., Casale Monferrato (IT)

( * ) Notice: Subject to any disclaimer, the term of this patent is extended or adjusted under 35 U.S.C. 154(b) by 0 days.

(21) Appl. No.: 10/276,445

(22) PCT Filed: May 21, 2001

(86) PCT No.: PCT/IB01/00885

§ 371 (c)(1),
(2), (4) Date: Mar. 18, 2003

(87) PCT Pub. No.: WO01/89357

PCT Pub. Date: Nov. 29, 2001

(65) Prior Publication Data

US 2003/0160064 A1 Aug. 28, 2003

(30) Foreign Application Priority Data

May 22, 2000 (IT) .................................... TO2000A0463

(51) Int. Cl.⁷ ......................... A47L 15/44; G01F 23/292
(52) U.S. Cl. ......................... 222/158; 222/154; 222/25; 73/293; 73/323; 73/327; 73/334; 73/427; 116/227; 116/DIG. 5; 68/17 R; 68/207; 134/113; 141/95
(58) Field of Search .............................. 222/23, 25, 26, 222/154, 156–158; 73/290 R, 293, 323, 325, 327, 334, 426, 427; 116/227, DIG. 5; 141/95; 68/17 R, 207; 134/93, 99.1, 99.2, 113

(56) References Cited

U.S. PATENT DOCUMENTS

| 2,368,705 A | * | 2/1945 | Du Pont et al. | 73/327 |
| 3,535,933 A | * | 10/1970 | Pliml, Jr. | 73/327 |
| 5,007,284 A | * | 4/1991 | Slone | 73/120 |
| 6,612,169 B1 | * | 9/2003 | Martin | 73/293 |

FOREIGN PATENT DOCUMENTS

| DE | 19545773 | * | 6/1996 | A47L/15/44 |
| FR | 2690740 | * | 11/1993 | G01R/23/28 |
| GB | 2195446 | * | 4/1988 | G01F/23/02 |

* cited by examiner

Primary Examiner—J. Casimer Jacyna
(74) Attorney, Agent, or Firm—Levine & Mandelbaum

(57) ABSTRACT

A washing agent dispenser is described, for a household washing machine, namely a dishwasher, said dispenser including a tank for containing a liquid washing agent, to which a device is associated for the visual control of the level of said liquid washing agent. According to the invention, said control device has a plurality of elements of a substantially transparent material, which are inserted in respective passages extending between said tank and the outside of the body of the dispenser.

The parts of each one of said transparent elements which are visible outside said body form the steps of a scale indicating the level of said liquid washing agent contained in the tank.

47 Claims, 5 Drawing Sheets

WASHING AGENT DISPENSER FOR A HOUSEHOLD A DISHWASHER

BACKGROUND OF THE INVENTION

The present invention relates to a washing agent dispenser for a household washing machine, namely a dishwasher and to a household washing machine using such a washing agent dispenser, as well as to a visual signalling device for such a washing agent dispenser and to an assembly method for such a visual signalling device.

As known, washing machines are usually equipped with a washing agent dispenser, meant as powder and/or liquid detergents and washing aids; typically, the latter consisting of softening media for laundry washing machines and rinsing aids for dishwashing machines.

In the instance of a dishwasher, washing agent dispensers usually comprise a body made from plastic material partially built-in on the machine inner-door, i.e. the side of the machine front loading door facing inside the wash tub.

The above body has a recess for containing a detergent, usually in powder form, which has a small tilting or sliding cover; opening of this cover is appropriately controlled by a machine programmer or timer.

A tank is also provided within the dispenser body, for containing a second liquid washing agent, typically a rinsing aid; usually, the amount of rinsing aid that can be loaded in the above tank, which is fitted with a proper plug, is sufficient for performing several wash cycles.

Typically, the dispenser has inside a small chamber being associated to the above tank, which is used for dosing the amount of rinsing aid to be released during a wash cycle; in particular, the rinsing-aid dosing system exploits the opening-closing movement of the machine door, i.e. horizontal in its open position and vertical in its closed position, for loading some rinsing aid from the tank to the dosing chamber; during the machine operation, the programmer operates an actuator for releasing a discharge outlet in correspondence with the dosing chamber, to let the dosed amount of rinsing aid flow from the latter in the wash tub of the dishwasher.

As said, the above tank generally has enough capacity for containing a sufficient amount of liquid agent to perform several wash cycles; thus, the machine user will only have to fill the tank through the proper plug periodically.

Dispensers as above are usually fitted with means informing the user about the need of filling the above tank with the liquid washing agent.

To this purpose, more sophisticated solutions have the dispenser fitted with a proper electric or electronic sensor, which is capable of detecting the presence of a liquid washing agent inside the relevant tank; this sensor is appropriately connected to the machine control system, so that the latter, should no liquid washing agent be detected inside the tank, enables optical and/or acoustical means, such as a lamp or a buzzer.

This type of solution, though being quite efficient, involves a considerable increase in cost for the dispenser, due to the presence of the sensor; also the machine using such a dispenser generally has a higher cost, due to the need of appropriately connecting the sensor to the machine control system and the relevant signalling means.

Less sophisticated solutions, on the contrary, have the a simple visual device associated with the tank, for ascertaining the level of the liquid washing agent.

Typically, this visual device comprises a circular passage extending from the tank containing the liquid washing agent to the front surface of the dispenser body; a transparent element in plastic, such as polycarbonate or methacrylate, whose shape matches the passage itself, namely cylindrical, is at least partially inserted in this passage; indications about the amount of liquid washing agent contained in the relevant tank can be obtained through this transparent element.

A dispenser as described above is illustrated in FIG. 1 of DE-A-195 45 773.

In any event, other solutions are also known, wherein one same dispenser is fitted with both an electric/electronic level sensor and a simple visual signalling device, as mentioned above.

Figures 1A, 1B, 2, 3:
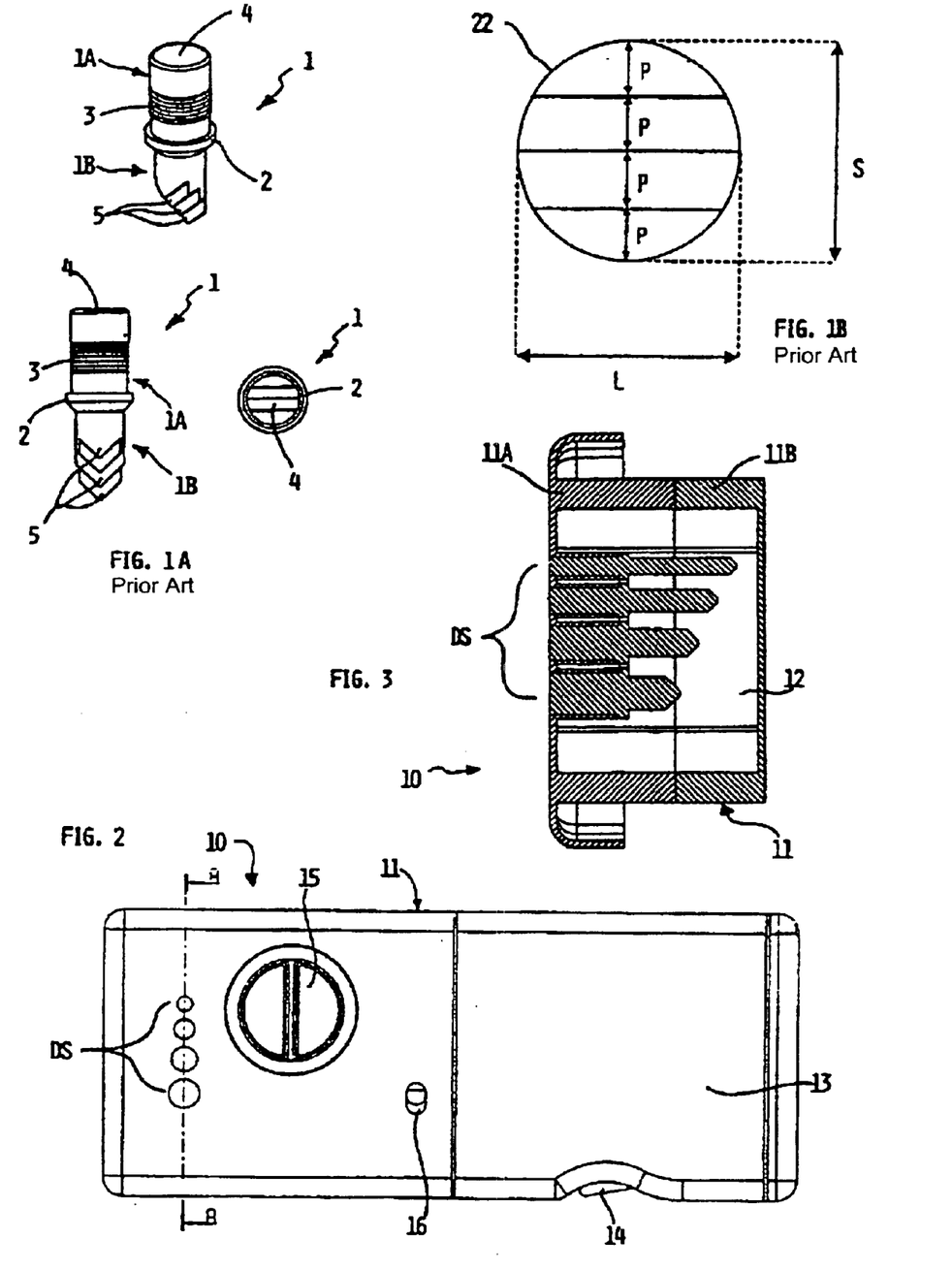
FIG. 1A shows, through different views, a transparent element of the known type, as previously described, being part of a level signalling device of a liquid washing agent for a washing agent dispenser according to the prior art.
FIG. 1B shows schematically the front surface, visible from outside a generic washing agent dispenser, of a transparent element of the type illustrated in FIG. 1A.
FIG. 2 shows schematically, by a front view, a washing agent dispenser according to the present invention.
FIG. 3 shows schematically, by a section view along the axis A—A of FIG. 2, of a washing agent dispenser according to the present invention.

In the annexed FIG. 1A there are represented different views of a typical known embodiment of a transparent element as above indicated, indicated with 1 as a whole.

As it can be noticed, the transparent element 1 has a mainly cylindrical shape, showing an upper portion 1A and a lower portion 1B delimited between them by a substantially circular flange 2.

The upper portion 1A is entirely cylindrical and is provided for being inserted with interference in the relevant passage defined in the dispenser body; it should be noticed that a dispenser body usually consists of two parts welded to each other, whereby the portion 1A of the transparent element 1 is inserted before this welding operation in the relevant circular passage from the side opposite to the side that forms the front surface of the dispenser.

The portion 1A is inserted in the relevant passage until the flange 2 strikes against the inner surface of the dispenser body; as said above, this is done with interference and the portion 1A of the element 1 has a set of surface knurls 3, whose function is to avoid possible draining of the liquid washing agent outside the tank; following the above insertion, the front surface 4 of the portion 1A is flush with the front surface of the dispenser body.

The lower portion 1B of the transparent element 1, on the contrary, is provided to result in being inserted within the tank containing the liquid washing agent; as it can be noticed, a set of projections 5 is delimited on its lower end, each one having a substantial triangular or pentagonal prism form, arranged alongside like steps, i.e. laying at different heights.

The operation of such a visual signalling device is quite simple.

When the loading door of the dishwashing machine is in its open position, i.e. horizontal (which is also the typical loading position of the liquid washing agent in the relevant tank), the number of projections 5 immersed in the liquid washing agent is in function of the amount of the latter; in other words, the higher the washing agent level in its relevant tank, the higher the number of projections 5 immersed in it.

The transparent element 1 is actually manufactured so as to visually transmit, from the projections 5 to the front surface 4, an indication of the level of the liquid washing agent, which depends on the number of projections 5 in contact with the liquid washing agent; should the liquid washing agent be lacking either totally or partially, the surface 4 would visibly show horizontal lines indicating the length-wise limits of the projections 5 not immersed in the liquid washing agent, due to optical effect (see for instance the plan view of FIG. 1A); thus, the surface 4 acts as a graduated scale, whose subdivisions or steps are delimited by these horizontal lines.

Therefore, when the machine door is open (a condition that has to precede the start of a wash cycle), the user is able to check whether the liquid washing agent is available or not and/or its level.

To this purpose, let us consider a transparent element 1 fitted with four projections 5 and assume that the tank containing the liquid washing agent is filled to half its capacity.

In this situation, only the two projections 5 laying farther from the surface 4 (i.e. the first two projections 5 starting from the bottom with reference to FIG. 1A) will be immersed in the liquid washing agent. This situation corresponds to an intermediate level indication on the front surface 4 of the transparent element 1; in particular, the lower half of the front surface 4 will have a first color shade due to the optical effect produced by the projections 5 immersed in the fluid.

Vice-versa, the upper half of the surface 4 will have a lighter color shade, substantially matching the standard shade of the material forming the transparent element 1; a horizontal line will be visible due to optical effect on this second half in correspondence with the point of demarcation between the two projections 5 not immersed in the fluid.

The above described solution, though being simple and cheap, has some drawbacks.

As a first drawback, the "reading" the information obtainable from the signalling device according to the known technique is actually not very easy; rather, it is quite difficult, above all in the event of the liquid level in the relevant tank being at its minimum. Another drawback related to the common technique is due to the manufacture of the portion 1B of the transparent element 1, on which only a restricted number of projections 5 can be delimited; as a result, the user only has few indications and/or a low measurement resolution about the filling level of the tank with the liquid washing agent.

In order to clarify the above drawbacks, reference is made to the annexed FIG. 1B showing substantially the front surface 4 of the transparent element 1.

As it can be noticed, the subdivisions of the graduated scale consisting of the front surface 4 of the element 1 are visible; these subdivisions are represented by the parallel horizontal lines that, by optical effect, can be seen in correspondence with the demarcation points between the various projections 5.

The dimensions in the vertical direction (with reference to the figure) of each subdivision, and relevant projection 5, hereinafter referred to as step P, are the same for all the projections 5; the dimensions in the horizontal direction of the various subdivisions and relevant projections, hereinafter referred to as widths, are different, since the depend on the circular section of the portion 1B of the element 1; in particular, the two end projections and divisions (i.e. lower and upper ones) have a minor width with respect to the possible maximum one indicated with L, with respect to the two central subdivisions and projections.

Therefore, according to the type of realization of the prior art, the overall development S of the graduated scale given by the sum of individual steps P will never exceed the dimensions of minimum encumbrance, or width, of the surface 4 (in the specific case corresponding to diameter L of said surface), on which the various steps P have to be represented.

As it can be noticed, in order to ensure a satisfactory reading of the graduated subdivisions and an efficient interpretation of the associated level information, step P, i.e. the relevant dimension of the projection 5, should be sufficiently large; as said above, this implies a lower measurement resolution.

Apparently, in an attempt to solve the above drawback, step P (i.e. the relevant dimensions of the projections 5) might be reduced, maintaining the diameter of the portion 1B of the element 1 constant; thus, the graduated scale visible on the front surface 4 of the element 1 itself would have a higher number of subdivisions.

An increase of the measurement resolution so obtained would however lead to a firm worsening of the comprehensibility of the information which can be obtained from the signaling device: it is clear, in fact, that the lower is the step P of the subdivisions, the higher is their difficulty of interpretation.

On the other hand, theoretically, the increase of the number of projections 5, though maintaining an acceptable step P, could be possible only by increasing the diameter of the transparent element 1.

According to the prior art, however, the diameter of the section of the transparent element 1 should always be a reduced one; this requirement is also determined by the fact that, during the manufacturing stage, the element 1 is actually "hammered" in its relevant passage with a considerable mechanical interference between the parts, so as to obtain a safe position and above all ensure the necessary sealing.

Based on the above, it is quite clear that the larger the dimensions of the transparent element 1 are, the higher the force required during manufacture will be for its insertion and sealing in the relevant passage.

It should also be considered that the larger the dimensions of the transparent element 1 are (and consequently the force required for its insertion with a considerable interference in its relevant seat), the higher the failure risks of the components during manufacture will be. In other terms, since a considerable force has to be exerted on the transparent element to insert it inside a slightly tighter passage (to warrant a hydraulic sealing of mechanical type), there will be quite a high probability of breaking either the transparent element itself or the portion of dispenser body, wherein the passage is delimited.

Therefore, the transparent element 1 according to the prior art should have a reduced section for the above reasons.

This requirement, as mentioned above, cause a difficult "reading" of the information which can be ascertained from the signalling device; the consequent restricted number of projections 5 determines a poor indication and/or measurement resolution.

SUMMARY OF THE INVENTION

It is the aim of the present invention to solve one or more of the above drawbacks and provide, in particular, a dispenser having a visual signalling device which allows for a more accurate and reliable optical control than the prior art, of the presence and/or the level of the liquid washing agent contained in a tank being part of the dispenser itself, whose manufacture and assembly are efficient and reliable.

Within this frame, a first aim of the present invention to provide such a dispenser whose visual signalling device allows for an easier and more accurate reading with respect to the prior art.

A further aim of the present invention is to provide such a dispenser whose visual signalling device allows for obtaining more accurate level information, i.e. having a higher resolution of measure with respect to the prior art.

A further aim of the present invention is to provide such a dispenser wherein the risks of defects and/or failure are minimized, during the manufacturing stage due to the coupling of the visual signalling device to the relevant seat.

A further aim of the present invention is to provide such a dispenser, whose visual signalling device is realized in such a way to obtain many different esthetical variants.

The above aims do not only apply to a washing agent dispenser, but also to the washing machine employing it, as well as to a visual signalling device for such a dispenser and an assembly method for such a visual signalling device.

One or more of said aims are attained, according to the present invention, by a washing agent dispenser for a household washing machine, namely a dishwasher, incorporating the features of the annexed claims, which form an integral part of the present description.

DESCRIPTION OF THE DRAWINGS

Further aims, features and advantages of the present invention will become apparent from the following detailed description and the annexed drawings, which are supplied by way of non limiting example, wherein.

DESCRIPTION OF THE PREFERRED EMBODIMENT

In FIGS. 2 and 3, reference number 10 indicates as a whole a washing agent dispenser according to the present invention, which has a boxed body 11, to be at least partially housed in an aperture provided on the inner-door of the door of a washing machine, namely a dishwasher; in the instance of the above FIGS. 2 and 3, the dispenser 10 is shown in the position it takes with the door of the washing machine in its closed position.

As in the prior art, the body 11 is made welding a front piece and a rear piece together, which are manufactured e.g. from a thermoplastic material, indicated in FIG. 3 with 11A and 11B, respectively.

Within said body 11 there are defined a recess for containing a determined amount of powder detergent, not visible in the figures, and a tank 12 for containing a liquid washing agent, visible in FIG. 3; dosing means of the liquid washing agent are associated to the tank 12, such as a small chamber not shown; at any rate, the above elements are known and their manufacture is apart from the purposes of the present invention.

Reference 13 indicates a tilting door for closing the above recess, which is pivoted on its upper portion in a know way to the portion 11A of the body 11; reference 14 indicates an opening/closing device of the small door 13, also known for its manufacture and operation. Reference 15 indicates the plug of an aperture in communication with the tank 12, used for loading the liquid washing agent in the latter.

Reference 16 indicates a discharge outlet, through which the liquid washing agent contained in the relevant dosing chamber inside the body 11, can be flown to the machine wash-tub; this outlet 16 has a proper stopper, in itself known, which is controlled by the machine control system, for releasing the liquid washing agent at the appropriate time during a wash cycle.

Reference DS indicates as a whole a signalling device being part of a visual control system of the level of the liquid washing agent. Contrary to the prior art, the device DS according to the invention comprises a plurality of transparent plastic elements, which are inserted in as many passages defined in the part 11A of the body 11, as further explained.

Figure 4:
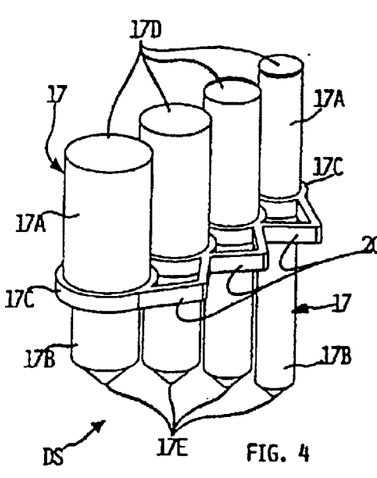
FIGS. 4–6 show, through a perspective view, a side view and a plan view respectively, a component of the washing agent dispenser according to the present invention.
Figure 5:
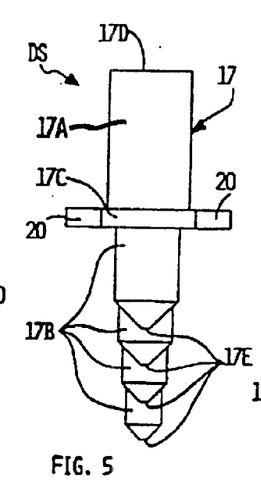
Figure 6:
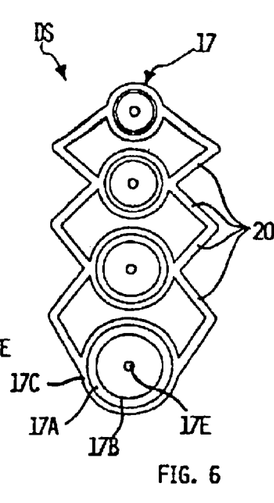

The device DS is represented in different views in FIGS. 4–6; as it can be noticed, in the example the device itself comprises four elements made from a transparent material, such as polycarbonate or methacrylate, indicated with 17, which are substantially aligned and/or parallel to each other.

In the body of each transparent element 17 an upper portion 17A and a lower portion 17B can be seen, being delimited between them by a flange 17C; in the example, each element 17 has a circular section, with the diameter of the portions 17A being larger than the diameter of the portions 17B.

From FIGS. 4–6 it can also be noticed how the various elements 17 have different length and diameter developments from each other; in the example, the element 17 with a larger diameter (the left one, with reference to FIG. 4) is shorter, whereas the element 17 with a smaller diameter (the right one, with reference to FIG. 4) is longer. However, the upper portions 17A of the various elements have length developments substantially equal to each other, so that their front surfaces 17D are substantially co-planar; vice-versa, the lower portions 17B have different lengths; it should also be noticed how the lower ends, indicated with 17E, of the portion 17B are substantially pointed or have anyway a narrowed section, eventually with a truncated or flattened tip, so as to make molding easier and/or provide a particular level indication in determined circumstances (as described with reference to FIG. 12).

It is pointed out, anyway, that the portions 17A and 17B of the various elements 17 may eventually have the same diameter and all elements 17 themselves have a constant diameter for the portion 17A and portion 17B; however, different combinations from the ones described above by way of example are also possible.

According to the present invention, each element 17 can be connected to the subsequent element of the set in correspondence with the respective flanges 17C through elastic and/or calibrated or predetermined rupture parts or foils 20, as described in the following.

Figure 7:
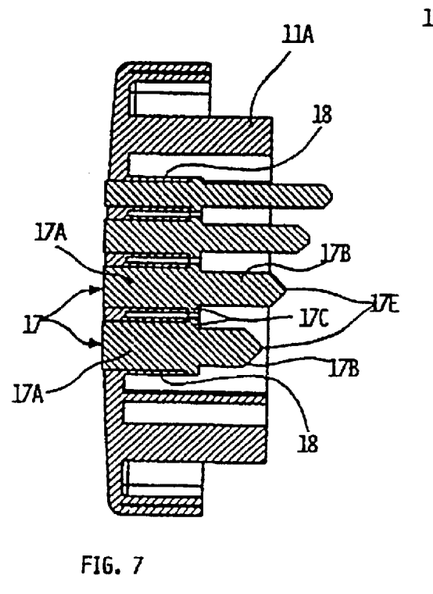
FIG. 7 shows, by an enlarged view alike FIG. 3, a portion of the body of the washing agent dispenser according to the present invention.
Figure 8:
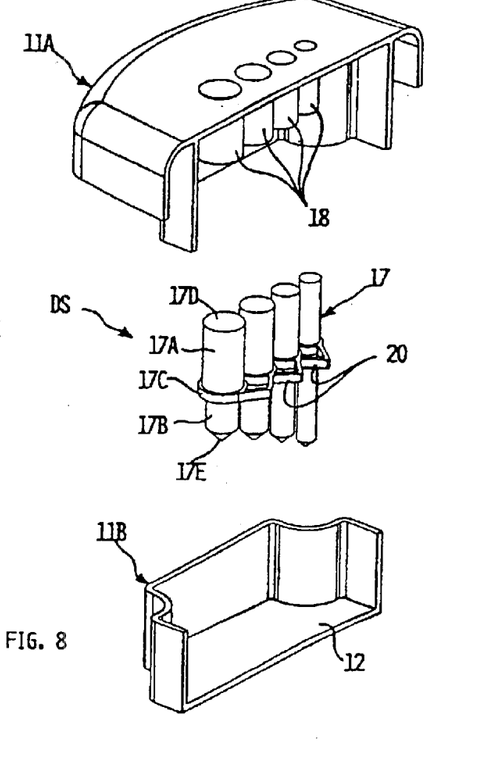
FIG. 8 shows, by an exploded partial view, a portion of the washing agent dispenser according to the present invention.

FIG. 7 illustrates a section of the part 11A of the body 11 of the dispenser 10 according to the invention, whereas FIG. 8 illustrates an exploded partial view of a portion of the dispenser 10; these FIGS. 7 and 8 show how the internal passages defined in the part 11A of the body 11 of the dispenser according to the present invention are in equal number as for the elements 17.

In particular, in correspondence of each passage in the part 11A, a respective internal through seat is defined, indicated with 18, whose shape and dimensions are apt for receiving the portion 17A of each element 17; in the example, the seats 18 have a circular section with a different diameter from each other, which is slightly smaller than the diameter of the portions 17A they will receive, so that the latter may be inserted with interference in the former. Preferably, the seats 18 have suitable mouthpieces, such as flares, being apt to facilitate automatic insertion and/or centering of the portions 17A.

From FIG. 8 it is also possible to imagine the assembly system of the device DS on the body of the dispenser object of the invention can be gathered, which is quite simple.

Practically, the element DS of FIG. 4 is driven in a known way with respect to the portion 11A of the body 11, so that the portions 17A of each element 17 are fitted in the respective seats 18, for then being inserted there with interference; as mentioned, the dispenser body consists of two pieces 11A and 11B welded to each other; the portions 17A are inserted in their relevant seats 18 before this welding operation from the side opposite to the side that forms the front surface of the dispenser.

The elements 17 are pushed in the seats 18 until the flanges 17C strike or rests on the lower end of the same seats, as clearly visible in FIG. 7; after this insertion, the front surfaces 17D of the portions 17A are substantially flush with the front surface of the part 11A of the body of the dispenser 10. It should be noticed how the above interference insertion is made possible by virtue of a slight elasticity of the thermoplastic material forming the body 11 of the dispenser.

The part 11A and part 11B of the body 11 can then be welded to each other, to have the tank 12 for containing the liquid washing agent defined inside them, wherein the portions 17B of the transparent elements 17 result in being inserted; therefore, after this assembly, the dispenser according to the present insertion appears as illustrated in FIG. 3.

The presence of the foils 20 allows for obtaining significant advantages during the assembly stage of the device DS.

From a first standpoint, it is clear that, due to the presence of the foils 20 interconnecting the various elements 17, the latter can be easily handled and "fitted" in the respective seats 18 of the part 11A of the body 11 through just one operation that can be easily automated.

From a second standpoint, since the foils 20 are elastic and/or of calibrated rupture, all the possible risks deriving from likely material shrinkage and/or manufacturing tolerances of the part 11A of the body 11 and/or the device DS are eliminated.

The above components are manufactured by molding a thermoplastic material, this particular manufacturing process may occasionally cause a shrinkage or light assessment of the material forming the part, with consequent small dimensional or position changes compared to the original mould figure.

In the instance of the present invention, likely problems deriving from such material shrinkage or manufacturing tolerances of the portion 11A can be obviated through the elasticity and/or possible rupture of the foils 20.

By way of specific example, let us assume that after the molding of part 11A, for the reasons previously mentioned, two or more seats 18 destined to house the portions 17A of the elements 17 result in being slightly more apart from or nearer to each other than as provided during the design stage.

In the event of a rigid interconnection of the elements 17, this different positioning of the seats 18 would actually make it impossible for the former to be inserted into the latter; vice-versa, according to the present invention, the elasticity of the foils 20 allows for a certain degree of "adaptability" of the device DS, ensuring at least a correct insertion of the upper ends of the portions 17A in their respective seats 18.

Once this initial insertion has been reached, the assembly operation of the device DS can be easily terminated by pushing with force the elements 17 in the relevant seats, as previously mentioned.

Since the foils 20 are of calibrated rupture, they may eventually break out, during the insertion stage with interference, should the positioning tolerances of the seats 18 exceed a certain threshold; this has no consequences for the prosecution of the assembly process and operation of the dispenser 10; this considering that such a possible rupture will anyway always occur after the portions 17A have been inserted in the respective seats 18, and that the subsequent step of the manufacturing process provides for the simple pushing of the former into the latter (which is apart from the fact that the various elements 17 are joined together).

Obviously, the above considerations also apply in the event where the component subject to manufacturing tolerances is the device DS itself, or in the event these tolerances may concern both the device DS and the part 11A of the body 11 of the dispenser 10.

The particular manufacture of the signalling device DS allows, on the other hand, to obtain further significant practical advantages.

First of all, according to the present invention, the overall dimensions of the graduated scale for signalling the level of the liquid washing agent are larger as s whole than those provided by the prior art; this is allowed by the fact that, according to the present invention, the various steps of the above scale are actually obtained from independent elements, i.e. the elements 17, which may also be in a large number.

It should be noticed how the suggested solution makes it possible to manufacture signalling devices DS having large overall dimensions (i.e. meant as a high number of steps for the level indication scale and/or elements 17 spaced between them), compatibly with the dimensions of the washing agent dispenser 10, and therefore offering various esthetical opportunities for its manufacture.

It should also be noticed that the smaller dimensions of the single elements 17 do not cause any potentially dangerous tensions or stress in the relevant seats 18; this will avoid failures and improve the sealing features, even without the use of special gaskets.

For the same reasons, it is also clear how the reading of the information which can be discerned from the signalling device DS is considerably easier with respect to the prior art.

To this purpose, FIGS. 9–12 illustrate schematically various possible operating conditions of the washing agent dispenser according to the present invention, by means of respective partial front views and sections along the axis A—A of FIG. 2; these examples illustrate a dispenser assembled on the tilting door of a dishwashing machine, the latter being in its open condition.

Figure 9:
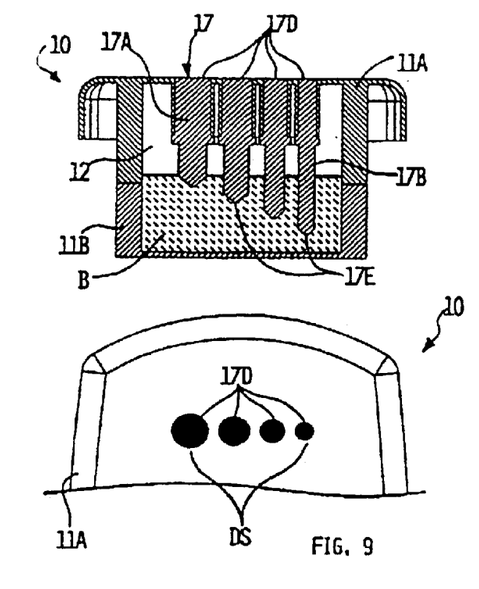
FIGS. 9–12 show, through partial section views and front views respectively, a washing agent dispenser according to the present invention, in various conditions of use.

In the instance of FIG. 9, the tank 12 contains the maximum possible amount of liquid washing agent; in the upper portion of this figure, the ends 17E of all elements 17 of the device DS are immersed in the liquid washing agent indicated with B.

As it can be noticed in the lower portion of the figure, this corresponds to a maximum level indication on a graduated scale formed by the set of the front surfaces 17D of the elements 17; in particular, these front surfaces 17D will have completely a first color shade, due to the optical effect produced by the immersion of all ends 17E in the liquid.

Figure 10:
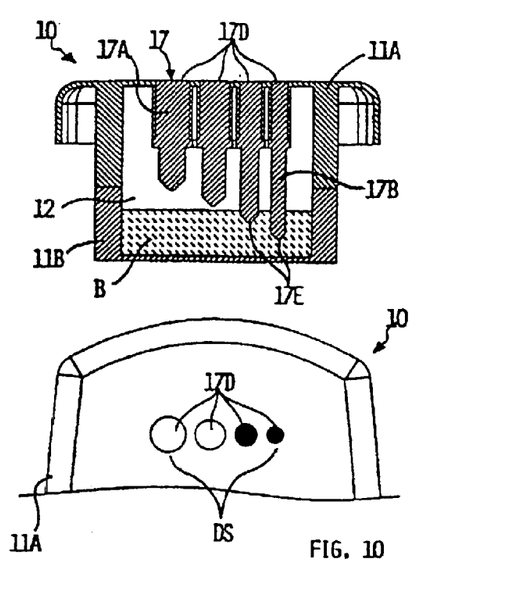

In the instance of FIG. 10, the tank 12 is filled only to half its capacity; as it can be seen in the upper portion of the figure, only the ends 17E of the two longer elements 17 (i.e. the two elements 17 whose portions 17B have a smaller diameter) are immersed in the liquid washing agent B.

As it can be noticed in the lower portion of the figure, this corresponds to an intermediate level indication on the graduated scale in the front part of the dispenser 10; in particular, only the front surfaces 17D of the above two longer elements 17 will show the cited first color shade, as above determined; vice-versa, the front surfaces 17D of the remaining elements 17 have a second color shade, being lighter, substantially matching the standard color of the material forming the transparent elements 17.

Figure 11:
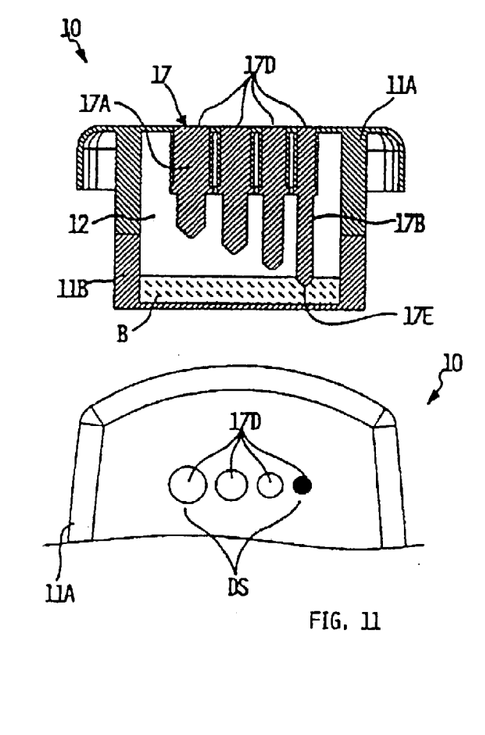

In the instance of FIG. 11, the tank 12 is filled to a minimum level; as it can be seen in the upper portion of the figure, only the end 17E of the longer element 17 (i.e. the element 17 whose portion 17B has a smaller diameter) is immersed in the liquid washing agent B.

As it can be seen in the lower portion of the figure, this corresponds to a minimum level indication on the graduated scale in the front part of the dispenser 10; in particular, only the front surface 17D of the longer element 17 shows the cited first color shade, as determined above; vice-versa, the front surfaces 17D of the remaining elements 17 will show the second lighter color shade.

Figure 12:
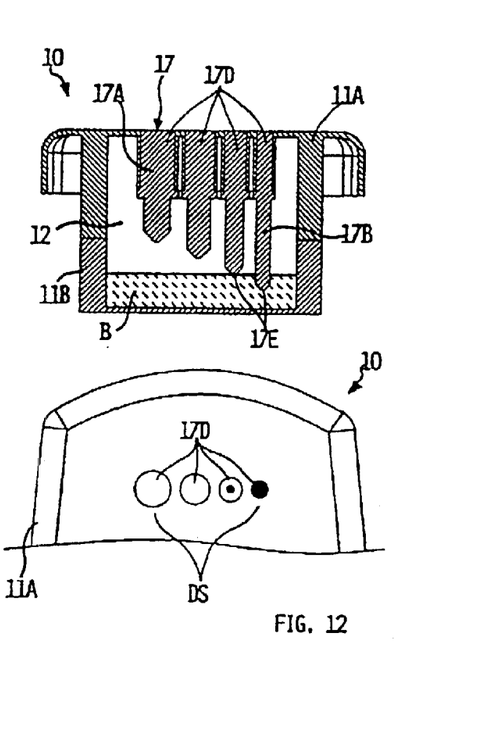

Finally, as regards FIG. 12, the tank 12 contains an intermediate amount of liquid washing agent compared to the amounts of FIGS. 10 and 11; as it can be seen in the upper portion of the figure, the end 17E of the longer element 17 is fully immersed in the liquid washing agent B, whereas the end 17E of the adjacent element 17 is only immersed for a small portion of its punctiform section.

As it can be seen in the lower portion of the figure, this corresponds to a particular level indication on the scale in the front part of the dispenser 10; in particular, the front surface 17D of the longer element 17 shows the above first color shade, whereas the front surface 17D of the adjacent element 17 will have the first color shade in its central area only, while the remaining area shows the second color shade; vice-versa, the front surfaces 17D of the remaining elements 17 will show the second color shade.

In the instance of transparent elements of the type as shown in the FIGS. 1A–1B, the level situation of FIG. 12 would cause a poorly identifiable indication, due to the reduced dimensions of the devices provided according to the prior art (see also the previous description with reference to FIG. 1B).

In other words, according to prior art, the available visual indication is difficult to read, or anyway the measurement resolution will be reduced, even in presence of a significant amount of liquid washing agent; vice-versa, in the case of the present invention, due to the possibility of having of various signalling elements 17, separated from each other, more intelligible and clearer indications are available.

It is also clear that, by realizing the device DS with more than four elements 17 as in the example, the user will be provided with more information, with a high measurement resolution about the filling degree of the tank 12 of the liquid washing agent.

It should be mentioned, in this connection, that the section dimension of the portions 17A of the transparent elements 17 may be much smaller, in order to reduce the failure risks of the components during the insertion stage; for example, the thrust to be exerted on the elements 17, for introducing them in the slightly smaller seats 18, can be considerably reduced with respect to prior art, so as to drastically reduce failure risks of the transparent elements themselves or of the part of the body of the dispenser 10 wherein the seats 18 are defined.

In the preferred embodiment of the invention, the various elements 17 and the foils 20 are realized in a single piece in transparent material, the device DS so forming an independent component; however, according to a possible variant embodiment of the present invention, nothing will hinder to realize the elements 17 separately from each other, for being then mutually joined by means of a special supporting component or template.

Figures 13, 14, 15:
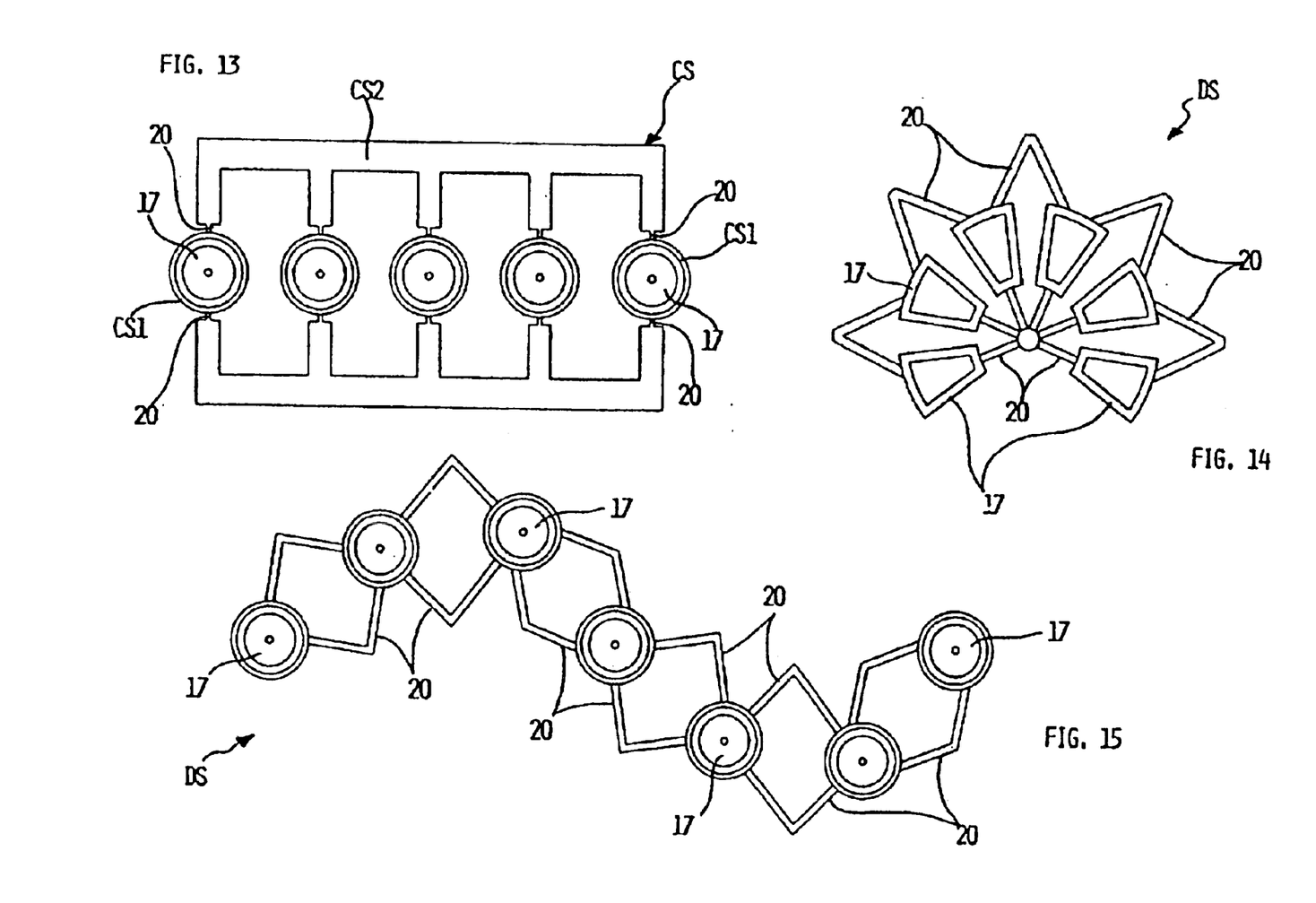
FIGS. 13–15 show, by respective plan views, some possible variant implementations of a component of the washing agent dispenser according to the present invention.

A possible embodiment of the above supporting element is indicated as a whole with CS in FIG. 13.

In the given example, the component CS comprises a plurality of rings CS1 having the same diameter, each one being apt to receive a corresponding element 17 (therefore, all elements 17 of this embodiment have the same diameter, but different length developments); the rings CS1 are then joined by means of elastic and/or of calibrated or predetermined rupture foils 20 to one same frame CS2.

Therefore, also using the supporting component CS which elastically join the various elements 17, the latter can be easily handled and "fitted" in the respective seats of the dispenser body, with just one operation which can be easily automated; eventually, the supporting component CS may be removed after the assembly of the device DS on the part 11A of the body 11.

According to the present invention it is clear, anyway, that the elements 17 separated from each other may also be assembled individually, i.e. one by one, on the dispenser body, or directly co-molded with the body itself.

The manufacturing equipment used for the dispenser may also be provided for inserting the single elements 17 during subsequent steps of the assembly cycle, or all at the same time without the supporting element CS, providing a suitable template and/or an automatic manipulator, which are apt to compensate likely positioning tolerances.

In particular, should the elements 17 be configured like individual components, they can be realized in different colors, but always with a suitable transparent material; obviously, transparent elements 17 may also be co-molded in one piece with different colored materials, whose joining points would result on the parts or foils 20 not visible following the assembling the device DS.

This possibility is extremely advantageous, both to allow a wide range of esthetical variants of the dispenser according to the present invention and to further improve the signalling quality for the user; within this frame, for example, the element 17 destined to indicate the presence of a reduced amount of liquid washing agent in the relevant tank may have for example a red coloring, to intuitively indicate that the tank has reached its low level condition.

From the above description, as well from the annexed claims forming an integral part of it, the features of the present invention are clear.

In particular, a washing agent dispenser 10 for a household washing machine, namely a dishwasher has been described, which comprises a tank 12 for containing a liquid washing agent; a device DS is associated to the tank 12, for the visual control of the level of the liquid washing agent, which comprises at least an element 17 made from a substantially transparent material, inserted in passage 18 extending between the tank 12 and the outside the body 11 of the dispenser 10.

A first portion 17A of the transparent element 17 is at least partially visible from outside the body 11 of the dispenser 10, whereas a second portion 17B of the transparent element 17 results in being inserted in the tank 12, the first portion 17A is susceptible of taking at least two different color shades, as to whether the respective lower portion 17B is immersed or not in the liquid washing agent.

According to the present invention, the control device DS comprises a plurality of said transparent elements 17 inserted in respective passage 18 distinct from each other, where the free ends 17E of the second portions 17B of at least of some of the various transparent elements 17 being provided lay inside the tank 12 at different height levels; in this way, the part 17D of the transparent elements 17 visible from the outside of the body 11 of the dispenser form the steps of a scale indicating the level of the liquid washing agent contained in the tank 12.

Each one of said transparent elements 17 can be joined at least to another of said elements 17, namely by means of joining parts or foils 20, which are elastic and/or of calibrated rupture.

From the above description and the annexed drawings also the advantages of the present invention are clear. In particular, in the dispenser described above:

the visual signalling device DS is of easier and more accurate reading compared to the prior art;

the visual signalling device DS allows for obtaining more accurate and higher defined information with respect to the prior art;

the manufacturing process of the dispenser, for the assembly of the visual signalling device DS, is simple and fast, and the failure risks during that stage are drastically reduced;

in spite of the significant dimensions of the device DS as a whole, the single elements 17 composing it can be assembled by mechanical interference, i.e. requiring no additional sealing elements;

the particular type of realization of the visual signalling device DS in separated parts allows, whenever necessary, to provided different coloring for the single steps of the graduated scale indicating the level of the liquid washing agent;

if required, the realization of the visual signalling device DS allows for providing a large number of esthetical variant for the dispenser, as well as having the single steps of the graduated scale indicating the level of the liquid washing agent by means of alphanumerical characters or symbols, as explained in the following.

Concerning the above last point, the shape of the various elements 17 may actually differ from the ones described by way of example, in order to obtain for example special esthetical-ornamental motives on the front surface of the dispenser 10. Similarly, the various transparent elements 17 of the device DS may not be arranged in aligned position along a straight line, as illustrated in the previous examples, but for example arranged to a semicircle or circle, or like an "S", etc.

For example, in the variant embodiment illustrated in FIG. 14, the various transparent elements 17 of the device DS have a section being circular section shaped, and are joined together by foils 20 to form a substantially arched shape for the metering scale of the liquid washing agent level.

Vice-versa, in the variant of FIG. 15, transparent elements 17 having a circular section are joined together by means of foils 20 to form a shape substantially curved to several directions for the metering scale of the liquid washing agent.

It is clear, anyway, that due to the particular manufacture suggested for the device DS, the various elements 17 can have different sections and/or be arranged according to different geometrical forms (such as oval, triangular, polygonal shape, and so on).

Figure 16:
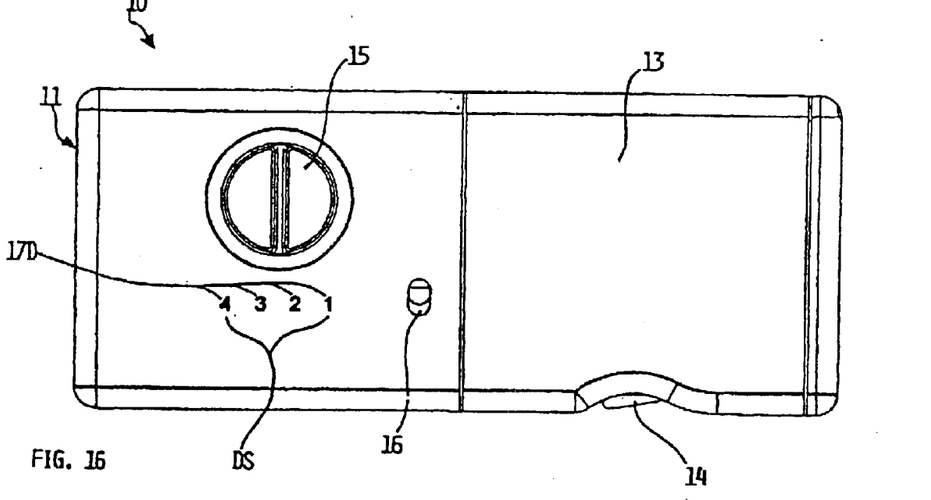
FIG. 16 shows, by a front view, a washing agent dispenser manufactured according to a possible variant of the present invention.
Figure 17:
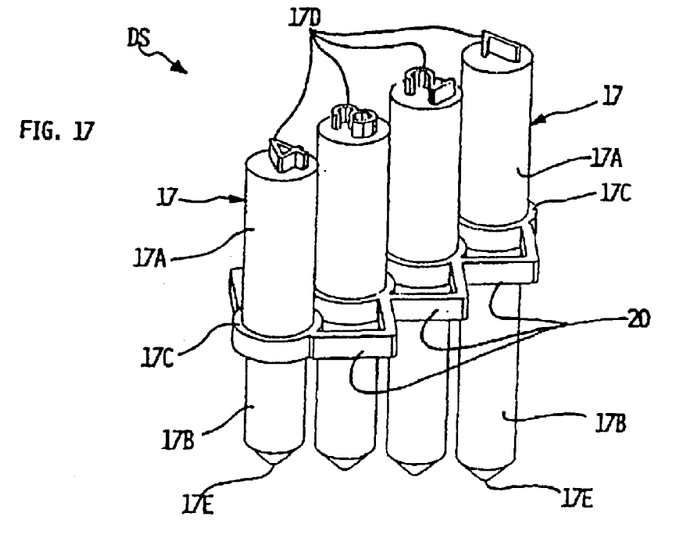
FIGS. 17–18 show a perspective and plan view, respectively, of a component of the washing agent dispenser according to the variant embodiment of FIG. 16.
Figure 18:
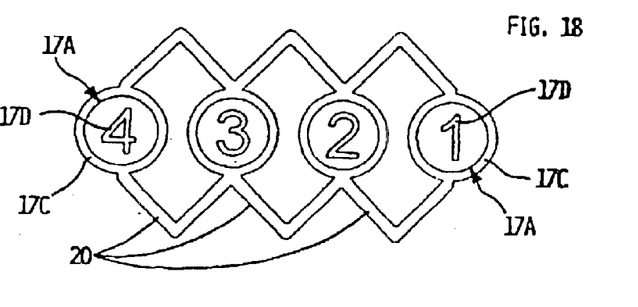

FIGS. 16–18 illustrate a further possible variant embodiment of the dispenser according to the present invention.

As it can be noticed from the FIGS. 17 and 18, the signalling device DS is formed by transparent elements 17 having the same diameter and different lengths, which are joined together by means of foils 20, as previously described.

However, with respect to the previous embodiments, in this case the front surfaces 17D of the various elements 17 are configured like numbers, for indicating the amount of washing agent contained in the relevant tank (in the cited example, the number with the highest value is associated to the element 17 bearing the shortest portion 17B).

As it can be noticed from FIG. 16, according to this embodiment, the upper end of each seat 18 (i.e. the end defined in correspondence with the front surface of the dispenser 10) is configured to match the number defined on the upper end of the element 17 that the seat 18 is destined to house.

Therefore, as shown in FIG. 16, the graduated scale indicating the rinsing-aid level will consist of a set of numbers, i.e. numbers "4", "3", "2", "1" in the cited example. It should be noticed how the upper portion 17A of the elements 17 is tightly coupled to the relevant seats 18, as previously described with reference to the assembly by interference.

Obviously, the assembly process of the signalling device DS according to the suggested variant embodiment is exactly as described above; similarly, also the dispenser operation in view of signalling the level of the liquid washing agent is exactly as previously described.

Of course, according to other alternative embodiments, on the front surface 17D of the various elements 17 forming the device DS, symbols or figures of various nature or alphanumerical characters or only alphabetic characters (such as to form the complete word "LEVEL") could be defined, instead of numbers.

Also the variant embodiment illustrated in the FIGS. 16–18 is particularly advantageous both for its possibility of managing many esthetical variants of the dispenser and for its level signalling quality; in this instance, in fact, beside to the signalling constituted by the different color shade taken by the various elements 17 in function of the available amount of the washing agent, the information received by the user will offer a more immediate reading.

It is obvious that many other changes are possible for the man skilled in the art to the washing agent dispenser, to the household washing machine employing such a washing agent dispenser, to the visual control device and to the assembly method for such a visual control device, described above by way of example, without departing from the novelty spirit of the inventive idea.

In order to increase seepage sealing features, each transparent element 17 may be fitted with knurls, as used by the prior art.

Additionally or alternatively to these knurls, each element 17 may also be fitted with proper sealing means, such as O-rings, operating between the seats 18 and flanges 17C.

As mentioned, the prevailing section of the elements 17 or of their portions 17A–17B may differ from the one previously illustrated and described; for instance, the sections may be oval or rectangular; in the latter case, likely sealing means will be configured to match the relevant location points provided by the transparent element and relevant seat.

Finally, according to other variant embodiments, a safe coupling can be reached between the elements 17 and the relevant seats 18 by bonding or welding, for example by ultrasound or analogous fastening systems.

Another possibility is to provide snap or elastic coupling means to ensure a correct work position of the transparent elements 17 in the relevant seats 18.

As an alternative, the correct work position of the transparent elements may be maintained through a mechanical deformation of the free end of the seats 18; this deformation may be obtained in temperature, by means of clinching or pressing of the end zone of the seats 18 on the flanges 17C, with the likely interposition of elastic sealing means.

The signalling device DS may be located, instead of the front surface, on one flank of the dispenser according to the invention, or part of it, particularly when the latter has to be fastened on a constantly vertical wall (i.e. not fastened to a tilting door, but to a fixed wall of a wash-tub or counter-door of a linearly sliding door); as an alternative, the dispenser body may be shaped for having a portion apt to house the signalling device DS in a comfortable position for its reading.

The tapering of the lower ends of the elements 17 is preferably 90° (i.e., for example, in the instance of a tapered form, this will be obtained by revolution of a triangle-rectangle having the angle associated to the cone vertex of 45°); in the instance of prismatic ends, two opposite end faces will be inclined from each other by 90°.

What is claimed is:

1. A washing agent dispenser for a household washing machine, said dispenser comprising a tank for containing a liquid washing agent, to which a control device is associated for the visual control of the level of the liquid washing agent, said control device comprising at least one element made from a substantially transparent material inserted in a passage extending between said tank and the outside of the body of the dispenser, wherein:

a first portion of said transparent element is at least partially visible outside said body and a second portion of said transparent element results in being inserted within said tank, said first portion is susceptible of taking at least two different color shades, as to whether the relevant lower portion is immersed or not in said liquid washing agent;

wherein said control device comprises a plurality of transparent elements inserted in respective distinct passages, the free ends of the second portions of at least some of the transparent elements being provided laying in said tank at different height levels, the parts of each of said transparent elements visible outside said body forming the steps of a scale indicating the level of said liquid washing agent contained in said tank.

2. A dispenser according to claim 1, wherein said transparent elements have length developments differing from each other.

3. A dispenser according to claim 1, wherein said first portions of said transparent elements have substantially the same length development.

4. A dispenser according to claim 1, wherein said second portions of said transparent elements have length developments substantially different from each other.

5. A dispenser according to claim 1, wherein said transparent elements and/or said passages are arranged substantially aligned and/or parallel to each other.

6. A dispenser according to claim 1, wherein each said transparent element is joined at least to another of said substantially elements.

7. A dispenser according to the claim 6, wherein said transparent elements are joined to each other by means of joining parts or foils.

8. A dispenser according to claim 7, wherein said joining parts or foils are elastic.

9. A dispenser according to claim 7, wherein said joining parts or foils have a calibrated or predetermined grade of rupture.

10. A dispenser according to claim 1, wherein said joining parts or foils and said transparent elements are realized so as to form a single piece.

11. A dispenser according to claim 1, wherein said transparent elements are joined to each other by means of supporting component or template.

12. A dispenser according to claim 1, comprising a flange disposed between said first portion and said second portion of said transparent elements.

13. A dispenser according to claim 6, wherein said transparent elements are joined to each other in correspondence of the respective flanges.

14. A dispenser according to claim 1, wherein said first portion and/or said second portion have a substantially circular section.

15. A dispenser according to claim 1, wherein the dimensions of section of said first portion differ from the dimensions of section of said second portion.

16. A dispenser according to claim 1, wherein said second portions have a free end substantially pointed and/or with a narrowed section.

17. A dispenser according to claim 1, wherein said transparent elements are coupled to the relevant passages by mechanical interference between the parts.

18. A dispenser according to the claim 17, wherein said passages have slightly smaller dimensions of section than the dimensions of section of the first portions they are going to house.

19. A dispenser according to claim 1, wherein said passages are configured for improving the insertion of said first portions, said passages having a flaring.

20. A dispenser according to claim 9, wherein said joining parts or foils are susceptible of predetermined rupture following the insertion of said first portions within the respective passages.

21. A dispenser according to claim 1, wherein the front parts of said transparent elements are at least partially aligned along to a straight line.

22. A dispenser according to claim 1, wherein the front parts of said transparent elements are aligned along a line at least partially curved, arranged as a semicircle or a circle or like an "S".

23. A dispenser according to claim 1, wherein said transparent elements have different shapes and/or sections from each other.

24. A dispenser according to claim 1, wherein said transparent elements have different colors from each other.

25. A dispenser according to claim 1, wherein the parts of said transparent elements being visible outside said body are at least partially configured for defining numbers and/or symbols and/or figures and/or alphabetic or alphanumerical characters.

26. A dispenser according to claim 25, wherein the parts of said transparent elements being visible outside said body are at least partially configured for defining numbers indicating the level of said liquid washing agent.

27. A dispenser according to claim 1, wherein the parts of said transparent elements being visible outside said body are at least partially configured for defining alphabetic characters, so as to form a complete word.

28. A dispenser according to claim 25, wherein the upper end of said passages is configured correspondingly to the upper end of the transparent element they have to house.

29. A dispenser according to claim 1, wherein said transparent elements are fitted with sealing knurls.

30. A dispenser according to claim 1, comprising elastic sealing means disposed between a passage and the respective transparent element.

31. A dispenser according to claim 1, wherein said transparent elements are at least three.

32. A dispenser according to claim 1, comprising snap or elastic coupling means for maintaining a correct work position of said transparent elements in the relevant passages.

33. A dispenser according to claim 1, wherein, in order to maintain a correct work position of said transparent elements in the relevant passages, the mechanical deformation is provided of at least an end zone of the latter.

34. A dispenser according to claim 1, wherein said transparent elements and/or said joining parts or foils are made from plastic material, such as polycarbonate or methacrylate.

35. A dispenser according to claim 1, wherein the coupling between said passages and said transparent elements is obtained by bonding or welding, specifically ultrasound welding, or analogous fastening technique.

36. A dispenser according to claim 1, wherein said body is obtained by welding a front part to a rear part.

37. A dispenser according to claim 1, wherein said body delimits a compartment for containing a second washing agent, fitted with relevant dispensing means.

38. A dispenser according to claim 1, wherein, in the instance of a tapered or cone-truncated form, the ends of said second portions have a 90° tapering with two opposite faces inclined from each other by 90°.

39. A household washing machine, having a dispenser for a washing agent, said dispenser comprising a tank for containing a liquid washing agent, to which a control device is associated, for the visual control of the level of said liquid washing agent, said control device comprising at least one element made from a substantially transparent material inserted in a passage extending between said tank and the outside of the body of the dispenser, wherein:
  a first portion of said transparent element is at least partially visible outside said body and a second portion of said transparent element results in being inserted within said tank,
  said first portion is susceptible of taking at least two different color shades, as to whether the relevant lower portion is immersed or not in said liquid washing agent;
  wherein said control device comprises a plurality of transparent elements inserted in respective distinct passages, the free ends of the second portions of at least some of the transparent elements being provided laying in said tank at different height levels, the parts of each of said transparent elements visible outside said body forming the steps of a scale indicating the level of said liquid washing agent contained in said tank.

40. A control device for the visual control of the level of a liquid washing agent contained in a tank of a washing agent dispenser, comprising a washing agent dispenser, said control device comprising at least one element made from a substantially transparent material inserted in a passage extending between said tank and the outside of the body of the dispenser, wherein:
  a first portion of said transparent element is at least partially visible outside said body and a second portion of said transparent element results in being inserted within said tank,
  said first portion is susceptible of taking at least two different color shades, as to whether the relevant lower portion is immersed or not in said liquid washing agent.
  wherein said control device comprises a plurality of transparent elements inserted in respective distinct passages, the free ends of the second portions of at least some of the transparent elements being provided laying in said tank at different height levels, the parts of each of said transparent elements visible outside said body forming the steps of a scale indicating the level of said liquid washing agent contained in said tank.

41. A method for assembling a visual control device having at least one element made from a substantially transparent material inserted in a passage extending between said tank and the outside of the body of the dispenser, wherein:
  a first portion of said transparent element is at least partially visible outside said body and a second portion of said transparent element results in being inserted within said tank,
  said first portion is susceptible of taking at least two different color shades, as to whether the relevant lower portion is immersed or not in said liquid washing agent;
  wherein said control device comprises a plurality of transparent elements inserted in respective distinct passages, the free ends of the second portions of at least some of the transparent elements being provided laying in said tank at different height levels, the parts of each of said transparent elements visible outside said body forming the steps of a scale indicating the level of said liquid washing agent contained in said tank,
  said method comprising guiding the transparent elements with respect to the part of the body of the dispenser wherein the respective passages are defined, so that the first portions of the transparent elements are at least partially inserted or fitted in said passages.

42. A method according to claim 41, further comprising inserting or pushing the transparent elements in the relevant passages until the front surfaces of the former are substantially aligned or flush to the front surface of the part of the body of the dispenser, wherein the passages are delimited.

43. A method according to claim 42, further comprising making integral with a second part of the body of the dispenser the part of the body of the dispenser wherein the passages are defined, by welding.

44. A method according to claim 41, wherein the transparent elements are handled and/or fitted and/or pushed in the respective passages simultaneously, by means of a single operation.

45. A method according to claim 44, wherein the transparent elements are handled and/or fitted and/or inserted in the respective passages by means of a supporting component or template.

46. A method according to claim 41, wherein the transparent elements are handled and/or fitted and/or inserted in the respective passages one by one.

47. A method for assembling a visual control device having at least one element made from a substantially transparent material inserted in a passage extending between said tank and the outside of the body of the dispenser, wherein:

a first portion of said transparent element is at least partially visible outside said body and a second portion of said transparent element results in being inserted within said tank, said first portion is susceptible of taking at least two different color shades, as to whether the relevant lower portion is immersed or not in said liquid washing agent;

wherein said control device comprises a plurality of transparent elements inserted in respective distinct passages, the free ends of the second portions of at least some of the transparent elements being provided laying in said tank at different height levels, the parts of each of said transparent elements visible outside said body forming the steps of a scale indicating the level of said liquid washing agent contained in said tank, wherein the transparent elements are directly co-molded with the part of the body of the dispenser wherein the relevant passages are defined.

* * * * *